United States Patent [19]

Trempe

[11] 4,323,413
[45] Apr. 6, 1982

[54] APPARATUS FOR MAKING TRUCK BODIES, UNITIZED SHELLS AND PANELS

[76] Inventor: Michel Trempe, 157 Principale St., St. Alexis de Montcalm, Canada, J0K 1T0

[21] Appl. No.: 171,140

[22] Filed: Jul. 22, 1980

[51] Int. Cl.³ ............................................. B32B 31/00
[52] U.S. Cl. .................. 156/382; 100/211; 156/285
[58] Field of Search ............... 156/285, 382, 580; 100/93 P, 211, 295

[56] References Cited

U.S. PATENT DOCUMENTS

| | | | |
|---|---|---|---|
| 2,418,438 | 4/1947 | Watts | 100/211 |
| 2,837,453 | 6/1958 | Englehart et al. | 100/211 |
| 3,025,208 | 3/1962 | Geiger | 156/382 |
| 3,553,054 | 1/1971 | Maus | 156/382 |

FOREIGN PATENT DOCUMENTS 734391 5/1966 Canada .
971092 7/1975 Canada .

*Primary Examiner*—Caleb Weston

[57] ABSTRACT

There is disclosed a vacuum bag apparatus for laminating large size structures. The various layers to be bonded together are stacked against a base form and are covered by a flexible vacuum bag. In order to submit the entire surface of the laminates to be bonded to uniform vacuum, the vacuum source is connected to a grid of perforated pipes extending between the laminates and the vacuum bag itself. The apparatus is particularly useful for making utilized truck bodies.

4 Claims, 8 Drawing Figures

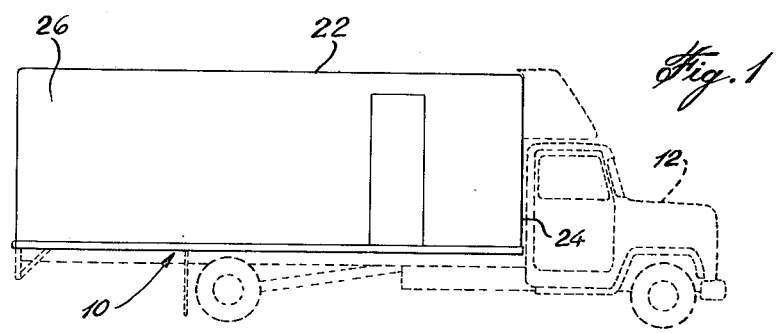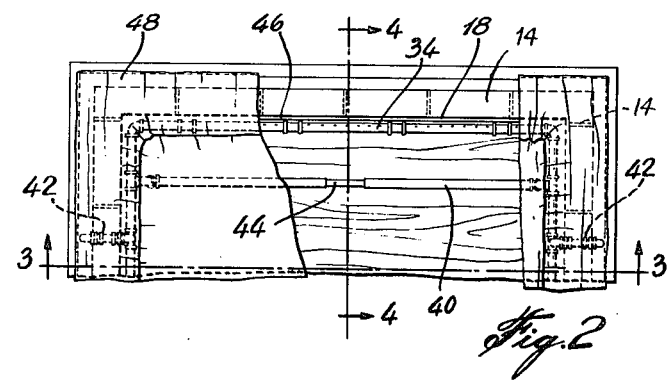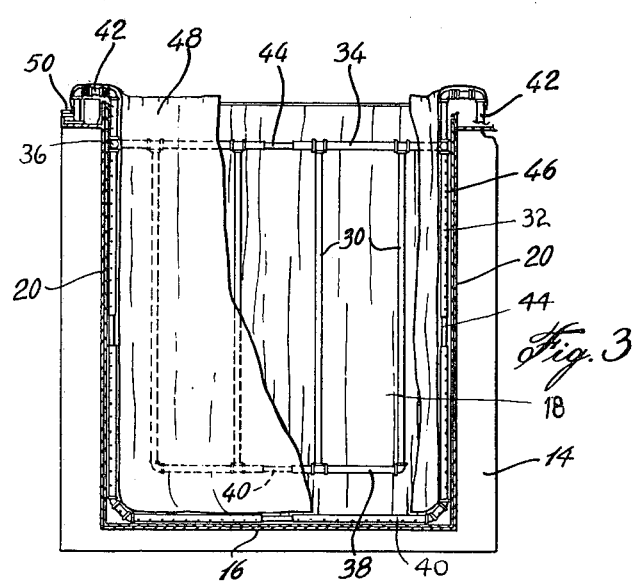

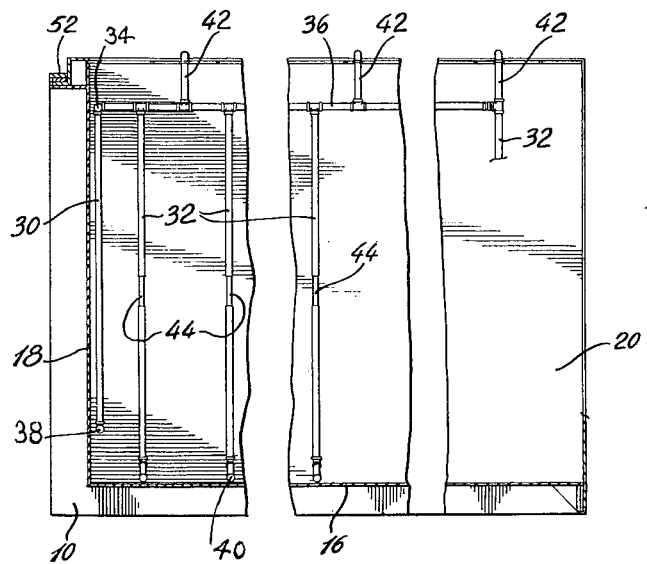
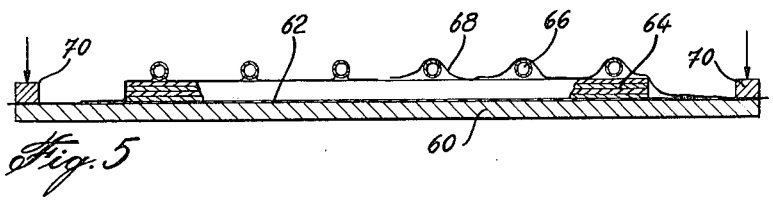
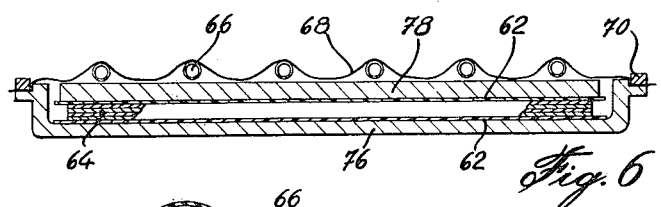
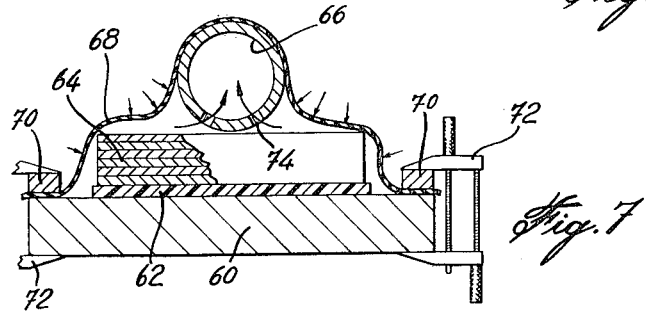

APPARATUS FOR MAKING TRUCK BODIES, UNITIZED SHELLS AND PANELS

FIELD OF THE INVENTION

This invention relates to a vacuum bag apparatus for making laminated and unitized structures, such as shells, panels and truck bodies, out of rigid substrate panels and covered with a fiber-reinforced plastic material.

BACKGROUND OF THE INVENTION

It is known to use a vacuum bag apparatus to ensure good bonding between various laminates in a laminated structure during curing of the bonding material. These air bag apparatuses comprise a flexible membrane connected to a source of vacuum supply. For large size laminates, it has been found that the internal vacuum is not uniformly distributed over the entire surface of the laminates, resulting in poor bonding and/or air pockets remaining between the bonded laminates. This problem arises more particularly when making truck bodies out of a rigid substrate, like plywood, foam plastic or the like, and covered with a fiber-reinforced plastic material.

OBJECTS OF THE INVENTION

It is therefore the object of the present invention to provide a vacuum bag apparatus having a much improved system for obtaining uniform vacuum within the apparatus in order to obtain uniform bonding of the various laminates.

Another object of the invention is to provide a vacuum bag apparatus of the character described, more particularly designed to make unitized, laminated truck bodies, shells, panels and the like.

SUMMARY OF THE INVENTION

The vacuum bag apparatus in accordance with the invention comprises a base form to support the various laminates to be bonded together, a flexible vacuum bag membrane peripherally secured to the base form around the laminates and a grid of interconnected perforated air conduits positioned between the membrane and the laminates and connected to a vacuum source, said air conduits acting as spacers between the membrane and the laminates, as well as a manifold for evacuating air within the vacuum bag to thus obtain uniform vacuum over the entire surfaces of the laminates to be bonded together. When applied to the manufacture of truck bodies, the apparatus comprises a mold having a bottom wall, an end wall and two side walls joined together and having internal dimensions corresponding to the size of the truck body, each wall being adapted to be lined with substrate, rigid panels, which are covered on at least their external surface with a layer of fiber-reinforced plastic material adapted to be bonded thereto, a grid of interconnected perforated air conduits adapted to be positioned in the mold adjacent the bottom, end wall and side walls thereof, a vacuum bag membrane engaging the exposed surface of the grid of air conduits and defining a sealed chamber with the bottom, end wall and side walls of the mold, and means for evacuating air from the closed chamber through said perforated air conduits, so as to compress and bond the layer of fiber-reinforced plastic material to the substrate panels uniformly over the entire surface of the truck body.

The air conduits in the bottom, and side walls of the mold, are preferably provided with expansion joints for facilitating fitting of the grid within the mold.

The invention will now be disclosed, by way of example, with reference to the accompanying drawings, in which:

FIG. 1 illustrates a side view of a truck body made in accordance with the invention;

FIG. 2 illustrates a top view of part of the molding assembly in accordance with the invention;

FIG. 3 illustrates a cross-section taken along line 3—3 of FIG. 2;

Figure 8:
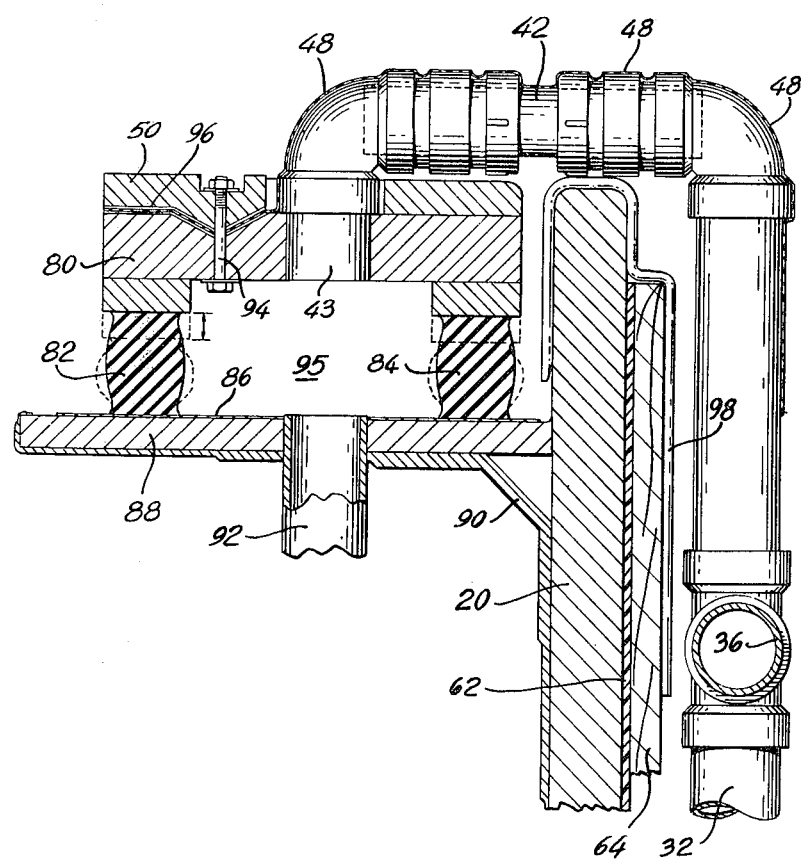

FIG. 4 illustrates a longitudinal section taken along line 4—4 of FIG. 2, with the vacuum bag membrane removed; and FIGS. 5 to 7 are cross-sections of the molding assembly illustrating the principle of operation of the apparatus in accordance with the invention, with FIG. 6 illustrating a second embodiment; and FIG. 8 is a cross-section, on an enlarged scale, of the manifold for the grid at the top of the mold.

Referring to the drawings, there is shown an apparatus for making the body 10 of truck 12. The apparatus is shown in FIGS. 2 to 4 and FIG. 8, and comprises a suitable frame 14 capable of holding together a mold structure comprising a bottom wall 16, an end wall 18 and side walls 20 of the mold. The walls of the mold are preferably made of metal and are joined together by any suitable means, or are made of fiber-reinforced plastic and form a single piece. The bottom wall 16 of the mold is for making the top 22 of the truck body, the end wall 18 for making the front 24, and the side walls 20 for making the sides 26. As commonly known, the back of the truck body is usually opened for installation of a door and, thus, the mold shown in the embodiment of FIGS. 2 to 4 does not provide a means for making the back of the body. Of course, the mold may also be provided with additional means for making part of a back wall and other extensions which it may be desired to mold with the truck body.

A grid of air conduits is adapted to be removably installed within the mold. The grid comprises a plurality of vertical spaced air conduits 30, which are adapted to be positioned adjacent the end wall 18 of the mold, and a plurality of vertical spaced air conduits 32, which are adapted to be positioned adjacent the side walls 20 of the mold. The air conduits 30 and 32 are inter-connected by a top, transverse air conduit 34 and 36, respectively. The lower ends of air conduits 30 are interconnected by a bottom transverse conduit 38. The bottom wall 16 is lined with spaced air conduits 40, which are connected to the lower end of the vertical air conduits 3 of the side walls 20 of the mold. The grid of air conduits is suspended from the top of the mold by elbow pipes 42, connected to a manifold unit, in turn removably connected to a vacuum source.

The ends of the elbow pipes 42 are inserted in a board 80, which surround three sides of the mold and which are provided at their underside with two sealing strips 82 and 84 of sponge rubber material, these sealing strips being on the outside and inside of the pipe outlet 43. These sealing strips removably rest on a smooth and flat surface 86 of a shelf 88 secured to the mold side walls 20 and end wall 18 by means of brackets 90. At one or more points of the shelf 88, a pipe 92 is secured thereto and opens between the two sealing strips 82 and 84 within the manifold chamber 95. The pipe 92 is connected to a source of vacuum.

The air conduits 32, 34, 36, 38, and 40 are provided with expansion joints 44, which permit easier installation of the grid into the mold. The air conduits are provided with a plurality of holes 46 for a purpose to be disclosed later. The grid of air conduits is covered with a vacuum bag membrane 48, which lines the bottom, end wall and side walls, and is secured by any suitable means, such as board 50, to the upper edge of the mold.

Referring to FIG. 8, the board 50 is removably clamped to the board 80 by means of bolts and nuts 94 with the membrane 48 extending therebetween. Preferably, the two surfaces of the boards 50 and 80, in contact with the membrane 48, are lined with rubber sheets 96 to further improve the air-tightness of the attachment of the membrane 48 to the manifold board 80.

The principle of operation of the apparatus in accordance with the invention will be disclosed with reference to FIGS. 5 to 7, which are by no means directly related to the structure shown in FIGS. 2 to 4. In FIGS. 5 and 7, there is shown a mold wall 60, coated with a release agent, upon which is placed a sheet of fiber-reinforced plastic material 62 which it is desired to glue to a plywood, or similar rigid substrate panel 64. Preferably, material 62 is a layer of uncured thermoplastic resin reinforced with glass fibers. A grid of air conduits 66 is placed upon the plywood sheet. Finally, a vacuum bag membrane 68 is placed over the assembly and secured against the edge of the mold wall 60 by any suitable means, such as board 70, which is placed against the edge of the membrane and tightened by means of a clamping device 72. As shown in FIG. 7, the conduits are provided with a plurality of holes 74 directed towards panel 64, but out of contact therewith. The membrane forms a sealed chamber with the mold wall 60, and when the conduits are connected to a vacuum source, atmospheric pressure is thus applied to the plywood sheet 64 to tighten it against the cured sheet, or uncured layer, of fiber-reinforced plastic material 62. The schematic diagram shown in FIG. 6 illustrates how the cured sheet, or uncured layer, of fiber-reinforced plastic material can be bonded to each surface of a substrate sheet 64 by placing the assembly between a mold wall 76 and an inside mold sheet 78 and applying vacuum.

In both embodiments, the grid of perforated air conduits effectively produces vacuum over the entire surface of the substrate panels and, consequently, effective bonding of the plastic to the panels without the formation of air pockets between the panels and the plastic.

It will now be easily seen how the truck body is made. The mold walls 16, 18, and 20 are lined with fiber-reinforced sheets of plastic material, or with a layer of uncured plastic containing glass fibers, such as layer 62 in FIG. 8, and such sheets or layer are covered with substrate panels 64 after having applied glue on the sheets of material when cured plastic is used, or a release agent on the mold walls when uncured plastic is used. Hook-shaped wire clips 98 removably engage the top edge of mold walls 18 and 20 and retain the layer 62 and panel 64 in position against the mold walls. An additional cured sheet, or uncured layer, of fiber-reinforced plastic material may be placed on the other side of the sheets of plywood of material, if desired, in the manner of FIG. 6. The grid of perforated air conduits is then installed into the mold and expanded (by means of expansion joints 44), so that it is close to the outside surface of the plywood panels. The grid is already covered with the vacuum bag membrane 48, which is sealed against the board 80. This board rests on shelf 88 by means of rubber cushion 84, which extends around the mold. Vacuum is then applied through pipe 92 and manifold chamber 95 to the grid of air conduits to apply atmospheric pressure to the mold and bond the fiber-reinforced plastic material to the substrate panels. After setting of the glue, or curing of the plastic layer, vacuum is removed and the membrane and the grid of air conduits lifted from the mold. The truck body may then be removed in a single piece from the mold.

When vacuum is produced in chamber 95, the cushion strips 82 are compressed, as shown in dotted lines in FIG. 8, resulting in air-proof joint between these cushions 82 and smooth surface 86 of shelf 88.

Although the invention has been disclosed with reference to a preferred embodiment, it is to be understood that it is not limited to such embodiment, and that other alternatives are also envisaged.

What I claim is:

1. A vacuum bag apparatus for making an integral truck body out of panels covered with an outside layer of fiber-reinforced plastic material bonded thereto, comprising:
    (a) a mold having a bottom wall, an end wall and two side walls joined together and having internal dimensions corresponding to the size of the truck body, each wall being adapted to be lined with panels, which are covered on at least one surface with a layer of fiber-reinforced plastic material adapted to be bonded thereto;
    (b) a grid of inter-connected perforated air conduits adapted to be positioned in the mold adjacent the walls thereof;
    (c) a vacuum bag membrane engaging the outside surface of the grid of perforated air conduits and defining a sealed chamber with the bottom wall, end wall and side walls, of the mold; and
    (d) means for evacuating said conduits to form a vacuum within said sealed chamber, so as to compress and bond the layer of fiber-reinforced plastic material to said panels.

2. An apparatus as defined in claim 1, wherein the air conduits in the bottom, end wall and side walls of the mold, are provided with expansion joints for facilitating installation of the grid in the mold.

3. An apparatus as defined in claim 1 or 2, wherein the perforations of said air conduits are directed away from said membrane and towards said panels, but are out of register with the latter.

4. An apparatus as claimed in claim 1 or 2, wherein said mold is open at its top and is provided with an externally-extending shelf near its top edge, said means for evacuating said conduits including a board removably extending around said mold and having at its underside two spaced substantially parallel resilient strips removably resting on said shelf to define a manifold chamber between said strips, said shelf and said board, said grid of interconnected perforated air conduits being connected to elbow pipes secured to said board and opening within said manifold chamber, and a source of vacuum having a pipe extending through said shelf and opening within said manifold chamber.

* * * * *